(12) United States Patent
Liang et al.

(10) Patent No.: US 9,094,478 B2
(45) Date of Patent: *Jul. 28, 2015

(54) PREREADING METHOD AND SYSTEM FOR WEB BROWSER

(71) Applicant: GUANGZHOU UCWEB COMPUTER TECHNOLOGY CO., LTD., Guangzhou (CN)

(72) Inventors: Jie Liang, Guangzhou (CN); Weiran Jiang, Guangzhou (CN)

(73) Assignee: GUANGZHOU UCWEB COMPUTER TECHNOLOGY CO., LTD., Guangzhou (CN)

( * ) Notice: Subject to any disclaimer, the term of this patent is extended or adjusted under 35 U.S.C. 154(b) by 109 days.

This patent is subject to a terminal disclaimer.

(21) Appl. No.: 13/965,069

(22) Filed: Aug. 12, 2013

(65) Prior Publication Data

US 2014/0047009 A1 Feb. 13, 2014

Related U.S. Application Data

(63) Continuation of application No. 13/381,342, filed as application No. PCT/CN2011/071915 on Mar. 17, 2011, now Pat. No. 8,527,585.

(51) Int. Cl.
  *G06F 15/16* (2006.01)
  *H04L 29/06* (2006.01)
  *G06F 17/30* (2006.01)
(52) U.S. Cl.
  CPC .......... *H04L 67/42* (2013.01); *G06F 17/30899* (2013.01)
(58) Field of Classification Search
  USPC .................. 709/231, 203, 204, 205, 217, 227
  See application file for complete search history.

(56) References Cited

U.S. PATENT DOCUMENTS

2002/0078165 A1   6/2002   Genty et al.
2002/0103778 A1   8/2002   Saxena
(Continued)

FOREIGN PATENT DOCUMENTS

CN   101189608 A   5/2008
CN   101777068 A   7/2010
WO   WO 2006/104952 A1   10/2006

OTHER PUBLICATIONS

Notice of Allowance dated Jan. 16, 2014 in Chinese counterpart application No. 201180003569.8, 2 pgs.
(Continued)

*Primary Examiner* — Lan-Dai T Truong
(74) *Attorney, Agent, or Firm* — Anova Law Group, PLLC

(57) ABSTRACT

The present invention relates to the field of Web browser technology, particularly to a prereading method and system for a Web browser, the method comprising: submitting, by a Web browser client, a first Web page visiting request to a target server and uploading an individual browsing record characteristic of the first Web page; forming, by a transfer server, a prereading policy according to the received individual browsing record characteristic of the first Web page and the stored at least one swarm browsing record characteristic of the first Web page; acquiring, by the transfer server, a Web page from the target server according to the prereading policy and sending the Web page to the browser client for buffering. The present invention makes it possible to preread Web pages according to individual users' visiting habits and preferences in combination with mass users' visiting history, and find out Web pages that a user is most likely to click through computational analysis of weights and preference coefficients on different page elements of Web pages, thereby realizing more precisely prereading, significantly increasing success rate of preread. Further, pages are downloaded in idle period, which advantageously saves time for users by substantially avoiding waiting.

27 Claims, 3 Drawing Sheets

(56) References Cited

U.S. PATENT DOCUMENTS

2008/0201310 A1* 8/2008 Fitzpatrick et al. ............... 707/4
2008/0208789 A1   8/2008 Almog
2009/0106381 A1* 4/2009 Kasriel et al. ................. 709/206

OTHER PUBLICATIONS

International Search Report and Written Opinion received in counterpart PCT application No. PCT/CN2011/071915, dated Jul. 14, 2011, with English language translations, 22 pages.

International Preliminary Report on Patentability received in counterpart PCT application No. PCT/CN2011/071915, dated Sep. 17, 2013, 7 pages.

Office Action dated Aug. 2, 2013, received in counterpart Chinese application No. 201180003569.8 (no translation available), 9 pages.

Office Action dated Dec. 4, 2013, received in counterpart Chinese application No. 201180003569.8 (no translation available), 3 pages.

Form PCT/ISA/220, dated Jul. 14, 2011, received in in counterpart PCT application No. PCT/CN2011/071915 (no translation available), 3 pages.

* cited by examiner

PREREADING METHOD AND SYSTEM FOR WEB BROWSER

CROSS-REFERENCE TO RELATED APPLICATIONS

This is a continuation of application Ser. No. 13/381,342, filed Dec. 28, 2011, published as US2012/0239732A1, now U.S. Pat. No. 8,527,585, which is a U.S. 371 National Stage of International application No. PCT/CN2011/071915, filed on Mar. 17, 2011, published as WO2012/122718A1, all of which are incorporated herein by reference in entirety.

FIELD OF THE INVENTION

The present invention relates to the filed of Web browser technology, and more particularly, to a method and system for prereading in a Web Browser,

BACKGROUND OF THE INVENTION

Common practice for Webpage prereading in prior art is as follows. The server pre-estimates which files need to be preloaded based on a user's history browsing behavior and Web page typeset in a client, and realizes Web page prereading according to the preloaded files when the user browses Web pages.

US application US2002078165A1 disclosed a smarter prefetching technique that determines whether a user prefers certain sub-pages of the web page and, if so, then prefetches these preferred sub-pages prior to the other sub-pages of the web page. The set of preferred sub-pages is generated by analyzing the user's actions during previous visits to the web page. These learned user preferences include a history of the sub-pages of a web page that have been requested by a user, the number of days back the history should be examined and how many sub-pages within the web page are considered distinct. For example, if a user visits the same news web site every morning and tends to always read the articles in the categories of "politics", "computing", "travel" and "books", then these preferenses will be determined when the news web page was visited. Then those articles will be downloaded into the browser memory before any other categories.

As can be seen, in prior art, it is possible to analyze history visiting behavior of a specific user and then preread Web pages according to his or her preference. This type of prereading has a satisfied success rate only under the premise that the user has visited a portal website/theme website and often visits the website. Such prereading is invalid if the current visited Web page has not been visited or has no preference parameter. Thus, the existing prereading scheme has a very low overall success rate and a very limited range of application.

Also, although it is possible to preread particular subpages in prior art, a user still needs to perform a turning operation on subpages to obtain these subpages from the buffer of the client.

SUMMARY OF THE INVENTION

A first object of the present invention is to provide a method for prereading in a Web browser to solve a problem that the existing prereading method cannot exactly preread. A second object of the present invention is to a system for prereading in a Web browser.

In order to achieve the first object of the present invention, the solution to be adopted is as follow.

A prereading method for a Web browser is provided, comprising: submitting a first Web page visiting request from a Web browser client to a target server via a transfer server, and uploading an individual browsing record characteristic of the first Web page from the Web browser to the transfer server; forming, by the transfer server, a prereading policy according to the received individual browsing record characteristic of the first Web page and at least one swarm browsing record characteristic of the first Web page previously stored in the transfer server; and acquiring, by the transfer server, a Web page from the target server according to the prereading policy and sending the acquired Web page to the browser client for buffering.

As a preferred example, the step of forming, by the transfer server, the prereading policy according to the received individual browsing record characteristic of the first Web page and the at least one swarm browsing record characteristic of the first Web page may comprise: sorting one or more page elements on the first Web page according to their prereading preference scores, and acquiring, by the transfer server, linked contents according to link addresses included in the first K page elements of the sorted one and more page elements, as preread contents, wherein K is a natural number greater than or equal to 1.

As a further preferred example, the prereading preference score may be calculated according to the following:

Prereading preference score of page element=Individual preference coefficient×Individual browsing record characteristic weight+Swarm preference coefficient×Swarm browsing record characteristic weight each page element is set with an individual preference coefficient according to the individual browsing record characteristic, each page element is set with a swarm preference coefficient according to the swarm browsing record characteristic, and an individual browsing record characteristics weight corresponding to the individual browsing record characteristic and a swarm browsing record characteristic weight corresponding to the one or more swarm browsing record characteristics are set in advance, wherein a summation of the individual browsing record characteristic weight and the one or more swarm browsing record characteristic weights is 1.

As a further preferred example, the individual browsing record characteristic is individual visiting times for one or more page elements containing link addresses on the first Web page, and the swarm browsing record characteristic is swarm visiting times for the transfer server with respect to one or more page elements on the first Web page.

As a further preferred example, the individual preference coefficient is a ratio of the individual visiting times for the page element to the total individual visiting times for all page elements containing link on the page to which the page element belongs, and the swarm preference coefficient is a ratio of the swarm visiting times for the page element to the total swarm visiting times for all the page elements having same swarm browsing characteristic on the page to which the page element belongs.

As a further preferred example, the prereading policy may further comprise: setting an order of the individual preference coefficients according to an order of the individual visiting frequencies of the page elements of the first Web page, and setting an order of the swarm preference coefficients according to an order of the swarm visiting frequencies of the page elements of the first Web page.

As a further preferred example, the prereading policy may further comprise: sorting one or more page elements on the first Web page according to their prereading preference scores, and merging and reorganizing, by the transfer server, link contents acquired according to link addresses contained in the first K page elements of the sorted one or more page elements, as preread contents.

As a further preferred example, the at least one swarm browsing record characteristic may include a first swarm browsing record characteristic, and the first swarm browsing record characteristic is determined as follows: performing statistical analysis, by the transfer server, on the first Web page; and if a page element containing a link address includes a key point, querying, in a mass user history visiting behavior statistics server, times for historically visiting the page element as the first swarm browsing record characteristic with respect to the page element.

As a further preferred example, the Web browser client may further upload one or more individual identity characteristics associated with the user's identity, the transfer server may further save one or more swarm identity characteristics associated with the one or more individual identity characteristics, the at least one swarm browsing record characteristic may include one or more second swarm browsing record characteristic corresponding to the one and more swarm identity characteristics, the swarm browsing record characteristic weight of the one or more swarm identity characteristics is set according to corresponding swarm identity characteristics, and the second swarm browsing record characteristic is determined as follows: performing statistical analysis, by the transfer server, on the first Web page, if a page element containing a link address includes a key point, querying, in a mass user history visiting behavior statistics server, times for historically visiting the page element with respect to a swarm identity characteristic corresponding to the individual identity characteristic, as the second swarm browsing record characteristic of the page element corresponding to the swarm identity characteristic.

As a further preferred example, the swarm visiting times for one or more page elements on the first Web page may be determined as follows: performing statistical analysis, by the transfer server, on the first Web page, and if a page element containing a link address includes a key point, querying times for visiting the key point in historically visiting the first Web page, as the swarm visiting times for the page element containing the key point.

As a further preferred example, the key point may be a keyword or a key diagram.

As a further preferred example, the at least one swarm browsing record characteristic may include a third swarm browsing record characteristic, the third swarm browsing record characteristic with respect to a swarm visiting frequency for one or more page elements on the first Web page is determined as follows: performing statistical analysis, by the transfer server, on the first Web page and querying a history frequency of turning to a second Web page after visiting the first Web page; determining a page element associated with the second Web page according to a link address contained in the page element on the first Web page to obtain the swarm visiting frequency for the page element.

As a further preferred example, the browser client may further upload one or more individual identity characteristics associated with the user's identity, the transfer server may further save the one or more swarm identity characteristics associated with the user swarm identity, the at least one swarm browsing record characteristic may include a fourth swarm browsing record characteristic, the fourth swarm browsing record characteristic with respect to a swarm visiting frequency for one or more page elements on the first Web page is determined as follows: performing statistical analysis, by the transfer server, on the first Web page, and querying a history frequency of turning to a third Web page after visiting the first Web page with respect to the swarm identity characteristic corresponding to the individual identity characteristic; determining a page element associated with the third Web page according to a link address contained in the page element on the first Web page, to obtain the swarm visiting frequency for the page element.

As a further preferred example, the Web browser client may be a mobile communication equipment terminal.

In order to achieve the second object of the present invention, the adopted solution is as follow.

A prereading system for a Web browser is provided, comprising: an uploading unit provided at a Web browser client, configured to submit a first Web page visiting request to a target server via s transfer server, and upload an individual browsing record characteristic of the first Web page to the transfer server; a prereading policy forming unit provided at the transfer server, configured to form a prereading policy according to the received individual browsing record characteristic of the first Web page and at least one swarm browsing record characteristic of the first Web page previously stored in the transfer server; and a reading unit provided at the transfer server, configured to acquire a Web page from the target server according to the prereading policy, and send the Web page to the Web browser client for buffering.

As a preferred example, the prereading policy forming unit may be configured to: sort one or more page elements on the first Web page according to their prereading preference scores, and acquire, by the transfer server, linked contents according to link addresses contained in the first K page elements of the sorted one or more page elements, as the preread contents, wherein K is a natural number greater than or equal to 1.

As a further preferred example, the prereading preference score may be calculated according to the following:

> Prereading preference score of page element=Individual preference coefficient×Individual browsing record characteristic weight+ Swarm preference coefficient×Swarm browsing record characteristic weight each page element is set with an individual preference coefficient according to the individual browsing record characteristic, each page element is set with a swarm preference coefficient according to the swarm browsing record characteristic, and an individual browsing record characteristics weight corresponding to the individual browsing record characteristic and a swarm browsing record characteristic weight corresponding to the one or more swarm browsing record characteristics are set in advance, wherein a summation of the individual browsing record characteristic weight and the one or more swarm browsing record characteristic weights is 1.

As a further preferred example, the individual browsing record characteristic is individual visiting times for one or more page elements containing link addresses on the first Web page, and the swarm browsing record characteristic is swarm visiting times of the transfer server for one or more page elements on the first Web page.

As a further preferred example, the individual preference coefficient is a ratio of the individual visiting times for the page element the total individual visiting times for all page elements containing link on the page to which the page element belongs, and the swarm preference coefficient is a ratio of the swarm visiting times for the page element to the total swarm visiting times for all the page elements having same swarm browsing characteristic on the page to which the page element belongs.

As a further preferred example, the prereading policy may further comprise: setting an order of the individual preference coefficients according to an order of the individual visiting frequencies of the page elements of the first Web page, and setting an order of the swarm preference coefficients according to an order of the swarm visiting frequencies of the page elements of the first Web page.

As a further preferred example, the prereading policy may further comprise: sorting one or more page elements on the first Web page according to their prereading preference scores, and merging and reorganizing, by the transfer server, link contents acquired according to link addresses contained in first K page elements of the sorted one or more page elements, as preread contents.

As a further preferred example, the at least one swarm browsing record characteristics may include a first swarm browsing record characteristic, and the first swarm browsing record characteristic may be determined as follows: performing statistical analysis, by the transfer server, on the first Web page; and if a page element containing a link address includes a key point, querying, in a mass user history visiting behavior statistics server, times for historically visiting the page element as the first swarm browsing record characteristic with respect to the page element.

As a further preferred example, wherein the Web browser client is also configured to upload one or more individual identity characteristics associated with a user's identity; the transfer server is also configured to store one or more swarm identity characteristics associated with the one or more individual identity characteristics, the at least one swarm browsing record characteristics may further comprise one or more second swarm browsing record characteristic corresponding to the one and more swarm identity characteristics, the swarm browsing record characteristic weight of the one or more swarm identity characteristics is set according to corresponding swarm identity characteristics, and the second swarm browsing record characteristic is determined as follows: performing statistical analysis, by the transfer server, on the first Web page, if a page element containing a link address includes a key point, querying, in a mass user history visiting behavior statistics server, times for historically visiting the page element with respect to a swarm identity characteristic corresponding to the individual identity characteristic, as the second swarm browsing record characteristic of the page element corresponding to the swarm identity characteristic.

As a further preferred example, the swarm visiting times for one or more page elements on the first Web page may be determined as follows: performing statistical analysis, by the transfer server, on the first Web page, and if a page element containing a link address includes a key point, querying times for visiting the key point in historically visiting the first Web page, as the swarm visiting frequency for the page element containing the key point.

As a further preferred example, the key point may be a keyword or a key diagram.

As a further preferred example, the at least one swarm browsing record characteristic may include a third swarm browsing record characteristic, the third swarm browsing record characteristic with respect to swarm visiting times for one or more page elements on the first Web page is determined as follows: performing statistical analysis, by the transfer server, on the first Web page and querying a history frequency of turning to a second Web page after visiting the first Web page; determining a page element associated with the second Web page according to a link address contained in the page element on the first Web page to obtain the swarm visiting frequency for the page element.

As a further preferred example, the prereading system may further comprise: an individual identity characteristic uploading unit provided at the Web browser client, configured to upload one or more individual identity characteristics associated with a user's identity; a swarm identity characteristic storing unit provided at the transfer server, configured to store one or more swarm identity characteristics associated with a user's swarm identity, the prereading policy forming unit further comprises a fourth swarm browsing record characteristic recording module, the fourth swarm browsing record characteristic with respect to a swarm visiting frequency for one or more page elements on the first Web page is determined as follows: performing statistical analysis, by the fourth swarm browsing record characteristic recording module, on the first Web page, and querying a history frequency of turning to a third Web page after visiting the first Web page with respect to the swarm identity characteristic corresponding to the individual identity characteristic; determining a page element associated with the third Web page according to a link address contained in the page element on the first Web page, to obtain the swarm visiting frequency for the page element.

As a further preferred example, the Web browser client may be a mobile communication equipment terminal.

The present invention makes it possible to preread Web pages according to individual users' visiting habits and preferences in combination with mass users' visiting history, and find out Web pages that a user is most likely to click through computational analysis of weights and preference coefficients on different page elements of Web pages, thereby realizing more precisely prereading, significantly increasing success rate of preread. Further, pages are downloaded in idle period, which advantageously saves time for users by substantially avoiding waiting.

The present invention may be applicable to the prereading of various kinds of Web pages, thereby significantly enhancing the experience of the Web Browser user.

DETAILED DESCRIPTION OF THE INVENTION

The present invention will be further described in detail hereinbelow in connection with drawings and specific embodiments.

Figure 1:
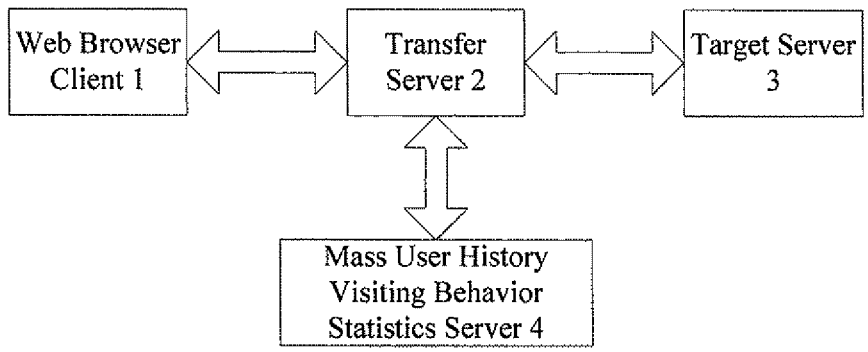
FIG. 1 is a system framework diagram of an embodiment of the present invention.
Figure 2:
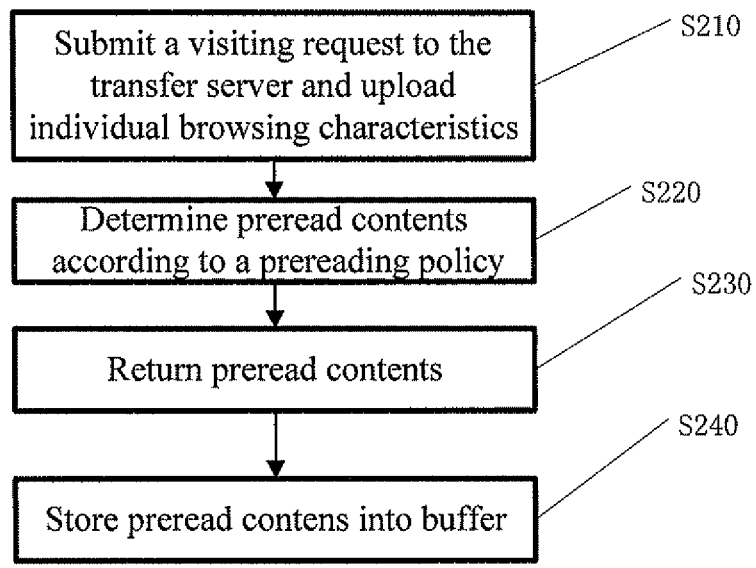
FIG. 2 is a flow chart of the first embodiment of the present invention.
Figure 3:
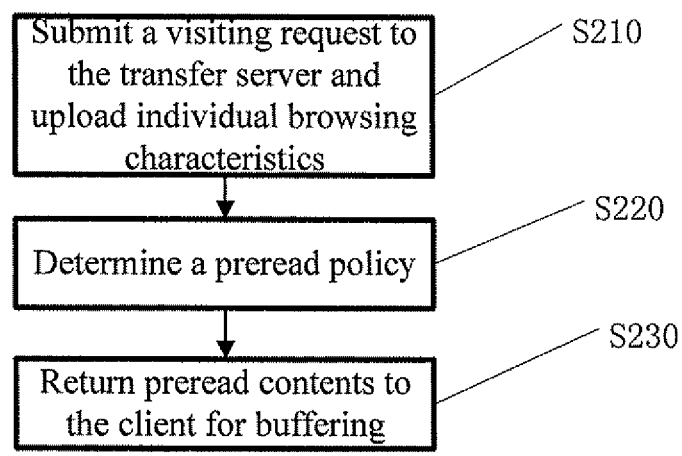
FIG. 3 is a flow chart of the second embodiment of the present invention.

FIG. 1 is a system framework diagram of an embodiment of the present invention. As shown in FIG. 1, a mobile terminal browser client 1 accesses a target server 3 via a transfer server 2, which is also connected with a mass user history visiting behavior statistics server 4.

The specific method is as follows.

In step S110, the browser client submits a first Web page access request to the target server via a transfer server, and uploads individual browsing record characteristics of the first Web page to the transfer server.

In step S120, the transfer server forms a prereading policy based on the received individual browsing record characteristics of the first Web page and the previously stored at least one swarm browsing record characteristics of the first Web page.

In step S130, the transfer server acquires Web pages from the target server according to the prereading policy, and sends them to the browser client's buffer.

Wherein, the prereading policy in step S120 is formed as follows.

First of all, Web page elements in a Web page are analyzed. There are three page elements that can trigger a user's clicking after page prereading: URL (Uniform Resource Location), text with URL and picture with URL.

The transfer server functions to find page elements that is most likely to be clicked by the user via computation based on individual user's habit for visiting Web pages in combination with mass users' history visiting behavior data statistics, and pushes them to the browser client.

Therefore, the individual browsing record characteristics in step S120 includes individual visiting frequency (i.e., visiting times) for one or more page elements including link addresses on the first Web page. The swarm browsing record characteristics includes swarm visiting frequency (i.e., visiting times) of the transfer server for one or more page elements on the first Web page. Preread contents are determined according to the individual visiting frequency and the swarm visiting frequency with the prereading policy. If the first Web page includes no page element including link address, a message indicating that preread contents can not be read is returned and the procedure ends.

The following weight algorithm is provided in the first embodiment.

The prereading policy includes: sorting one or more page elements on the first Web page according to their prereading preferences score; acquiring, by the transfer server, linked contents according to link addresses included in the first K page elements of the sorted one and more page elements, as preread contents, wherein K is a natural number greater than or equal to 1. Each page element is set with an individual preference coefficient according to the individual visiting frequency, and each page element is set with a swarm preference coefficient according to the swarm visiting frequency. An individual browsing record characteristic weight corresponding to an individual browsing record characteristic and a swarm browsing record characteristic weight corresponding to one or more swarm browsing record characteristic are set in advance. The prereading preference score is calculated according to the following preference:

Prereading preference score of page element=Individual preference coefficient×Individual browsing record characteristic weight+ Swarm preference coefficient×Swarm browsing record characteristic weight If the first Web page contains no page element including link address, a message indicating that preread contents can not be read is returned.

The individual preference coefficient is which page elements are most frequently visited after visiting the Web page based on the individual user's habit, for example, 3 page elements, namely the most frequently visited URL, text with URL and picture with URL, respectively. The preference coefficients are set according to the user's habit. For example, according to the user's habit, he/she clicks pictures up to 400 times when visiting a Web page, and clicks texts and URLs 300 times, then the page element 1 (corresponding to text with URL) has a preference coefficient of 0.3 (i.e., 300/(300+ 300+400)=0.3), the page element 2 (corresponding to URL) has a preference coefficient of 0.3 (i.e., 300/(300+300+400) =0.3), and the page element 3 (corresponding to picture with URL) has a preference coefficient of 0.4 (i.e., 400/(300+300+ 400)=0.4). The individual browsing record characteristic weight is set to 0.7. For other page elements including link URLs, the preference coefficient may be set to 0.

There may be a plurality of swarm browsing record characteristics.

In the first embodiment, the swarm browsing record characteristic 1 is as follows: the transfer server performs statistical analysis on the first Web page, if the page elements including link addresses include keywords for prereading, the mass user history visiting behavior statistics server is queried to obtain the times of visiting this keyword in history as the swarm visiting frequency for the page element including keywords, wherein the keywords are determined by the mass user history visiting behavior statistics server via historical statistics.

Taking 3 page elements as an example, page element 1 includes the keyword "next page", page element 2 includes "next chapter" and page element 4 includes "news", and the clicking times for page element 1 is set to 60000 (with a preference coefficient of 0.6=60000/(60000+30000+ 10000)), the clicking times for page element 2 is 30000 (with a preference coefficient of 0.3=30000/(60000+30000+ 1000)), and the clicking times for page element 4 is 10000 (with a preference coefficient of 0.1=1000/(60000+30000+ 10000)). The swarm browsing record characteristic weight is set to 0.2.

Figure 5:
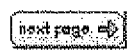
FIG. 5 is an example of a key diagram.

The swarm browsing record characteristic 2 queries the mass user history visiting behavior statistics server based on a key diagram for prereading. The key diagram refers to a picture with hyperlink that has most specific directivity in a Web page of a website, which is denoted by a picture with URL. In Web pages of a website, the key diagram may be a finger or an arrow, which are generally represented in form of picture, as shown in FIG. 5. The mass user history visiting behavior statistics server determines, from Web pages, the clicking times for the most frequently visited preread key diagram, for example, the clicking times for the page element 3 is 80000 (with a preference coefficient of 0.8=80000/ (80000+20000)), and the clicking times for the page element 5 is 20000 (with a preference coefficient of 0.2=20000/ (80000+20000)). The swarm browsing record characteristic weight 2 is set to 0.1.

Then, the preread possibility of the page element (i.e. the preread preference score of page element) f is as follows:

$f$=individual preference coefficient×individual browsing record characteristic weight+swarm preference coefficient×swarm browsing record characteristic weight That is,
f1=0.3×0.7+0.6×0.2=0.33;
f2=0.3×0.7+0.3×0.2=0.27;
f3=0.4×0.7+0.8×0.1=0.36;
f4=0.1×0.2=0.02;
f5=0.2×0.1=0.02.

The above 5 page elements are sorted according to the preread preference score f, and it reveals that f3>f1>f2>f4=f5.

If this Web page has not been visited, all page elements on this Web page have individual preference coefficients of 0, and the above calculation becomes:
f1=0×0.7+0.6×0.2=0.12;
f2=0×0.7+0.3×0.2=0.06;
f3=0×0.7+0.8×0.1=0.08;
f4=0.1×0.2=0.02;
f5=0.2×0.1=0.02.

The above 5 page elements are sorted according to the preread preference score f, and it reveals that f1>f3>f2>f4=f5.

It is noted that k is set according to experience and may be an arbitrary number between 3 and several dozens. The summation of the preference coefficients in one individual browsing record characteristic or one population browsing record characteristic is 1. The summation of weights of an individual browsing record characteristic and one or more swarm browsing record characteristics is also 1. As to specific setting, it is set according to experience values in practice.

In the above mentioned prereading policy, the considered swarm browsing record characteristics are shown in Table 1 and may include specifically the following:

1. Global keyword, and in this case, the times for visiting this keyword in history are obtained by querying the mass user history visiting behavior statistics server as the swarm visiting frequency, wherein the keyword is determined by the mass user history visiting behavior statistics server via historical statistics.

2. Domain name based keyword, and in this case, the times for visiting this keyword in history under the same domain name are obtained by querying the mass user history visiting behavior statistics server as the swarm visiting frequency.

3. Domain name based key diagram, and in this case, the times for visiting this key diagram in history under the same domain name are obtained by querying the mass user history visiting behavior statistics server as the swarm visiting frequency.

4. Link text based on user's history operation habit with respect to a certain Web page, and in this case, the frequency with which the same user historically visits the same link text is acquired by querying the mass user history visiting behavior statistics server as the swarm visiting frequency.

5. Link picture based on user's history operation habit with respect to a certain Web page, and in this case, the frequency with which the same user historically visits the same link picture is acquired by querying the mass user history visiting behavior statistics server as the swarm visiting frequency.

TABLE 1

Table of swarm browsing record characteristics

| Swarm browsing record characteristics | Global keyword |
| --- | --- |
| | Domain name based keyword |
| | Domain name based key diagram |
| | Link text based on user's history operation habit with respect to a certain page |
| | Link picture based on user's history operation habit with respect to a certain page |

In the above prereading policy, the visiting times of a page element may also be used directly, and the above example is taken similarly.

Since the visiting times are directly used for calculation, the weight for the swarm browsing record characteristic needs to be set small. For example, the weight for the individual browsing record characteristic is set to 0.997, the first swarm browsing record characteristic weight (i.e., corresponding to the swarm browsing record characteristic 1) is set to 0.002, and the second swarm browsing record characteristic weight (i.e., corresponding to the swarm browsing record characteristic 2) is set to 0.001, then:

f1=300×0.997+60000×0.002=419.1;
f2=300×0.997+30000×0.002=359.1;
f3=400×0.997+80000×0.001=478.8;
f4=10000×0.002=20;
f5=20000×0.001=20.

The above 5 page elements is sorted according to the preread preference score f, and it reveals that f3>f1>f2>f4=f5.

The second embodiment of the present invention has the following specific steps.

In S310, the browser client submits a Web page visiting request to the target server via the transfer server, and at the same time uploads to the transfer server the individual browsing record characteristics with which the customer visits the first Web page via the browser client and one or more individual identity characteristics associated with the user identity.

In S320, the transfer server determines preread contents according to the prereading policy, using the uploaded individual browsing record characteristics, the uploaded individual identity characteristics, the one or more swarm browsing record characteristics for the first page and the swarm identity characteristics previously stored in the transfer server.

In S330, the determined preread contents are returned to the browser client.

In S340, the browser client stores the preread contents in the buffer.

Wherein, the individual identity characteristics are identify characteristics associated with user identity, e.g., characteristics related to individual identity such as sex, job type, educational qualification, etc.

The swarm identity characteristics are carried out statistic by the mass user history visiting behavior statistics server, and are identity characteristics associated with all users' identities, such as sex, job type, educational qualifications etc.

The prereading policy is substantially same as that of the first embodiment. The only difference between them is that the preference coefficients and the swarm browsing record characteristic weights are classified based on swarm identity characteristics. An example is as follows.

For example, according to the user's habit, he/she clicks pictures up to 400 times when visiting a Web page, and clicks texts and URLs 300 times, then the page element 1 (corresponding to text with URL) has a preference coefficient of 0.3, the page element 2 (corresponding to URL) has a preference coefficient of 0.3, and the page element 3 (corresponding to picture with URL) has a preference coefficient of 0.4. The individual browsing record characteristic weight is also set to 0.7. For other page elements including link URLs, the preference coefficient may be set to 0.

At the same time, for this user, the sex is male, the job type is programmer and educational qualification is master, then there may be a plurality of swarm browsing record characteristics.

The transfer server performs statistical analysis on the first Web page. If the page elements including link addresses include keywords, the mass user history visiting behavior statistics server is queried to obtain the times for visiting this keyword in history, as the swarm visiting frequency of the page element including keywords, wherein the keywords are determined by the mass user history visiting behavior statistics server via historical statistics.

Taking 3 page elements as an example, page element 1 includes the keyword "next page", page element 2 includes "next chapter", and page element 4 includes "news".

Corresponding to the sex of male, the page element 1 has a preference coefficient of 0.6, the page element 2 has a preference coefficient of 0.3, and the page element 4 has a preference coefficient of 0.1. The first swarm browsing record characteristic weight is set to 0.25.

Corresponding to the job type of programmer, the page element 1 has a preference coefficient of 0.3, the page element 2 has a preference coefficient of 0.5, and the page element 4 has a preference coefficient of 0.2. The second swarm browsing record characteristic weight is set to 0.04.

Corresponding to the educational qualification of master, the page element 1 has a preference coefficient of 0.8, the page element 2 has a preference coefficient of 0.1, and the page element 4 has a preference coefficient of 0.1. The third swarm browsing record characteristic weight 3 is set to 0.01.

$f1=0.3\times0.7+0.6\times0.25+0.3\times0.04+0.8\times0.01=0.380$;
$f2=0.3\times0.7+0.3\times0.25+0.5\times0.04+0.1\times0.01=0.306$;
$f3=0.4\times0.7=0.28$;
$f4=0.1\times0.25+0.2\times0.04+0.1\times0.01=0.034$;

The above 4 page elements are sorted according to the preread preference score f, and it reveals that $f1>f2>f3>f4$.

The transfer server acquires the first k subpages (k is generally a natural number less than or equal to 4), and may merge and reorganize the acquired subpages with similar URLs, then transmits them to the buffer of the mobile terminal again. When a user clicks the above-mentioned keywords or the most frequently visited page links on the currently browsed Web page, the mobile terminal invokes the preread pages in the buffer directly for displaying.

In prereading of some Web pages, such as serialized story on Web pages, the following policy may be used, wherein the priorities of preread keywords decrease in turn from left to right:

̄Next Page  ̄[Next Page]  ̄Next Page  ̄[Next Page]  ̄[Next Page| ̄>>Next Page ̄>>Next Page| ̄Next Sheet  ̄[Next Sheet]  ̄[->]  ̄>  ̄[->>]  ̄>>  ̄[>>]  ̄Next Chapter  ̄[Next Chapter]  ̄Next Chapter  ̄[Next Chapter]  ̄Next Section  ̄[Next Section]  ̄". The transfer server determines the priorities of keywords on a Web page, selects the keyword with the highest priority, and saves subpages to which the keyword links and next subpages to which the same keyword on the above subpages links. For example, the first page of a paper of news only has abstract of the news, and the keyword with highest priority on the page is "Next Page". The text of the news has 5 pages altogether and each page has the keyword "Next Page" on its bottom. Then the transfer server will preread the second to the fifth pages of the news as subpages of the first page. However, the number of subpages that are to be merged and reorganized are generally no more than 4, and it is preferable to merge and reorganize 2-3 layers of subpages.

Figure 4:
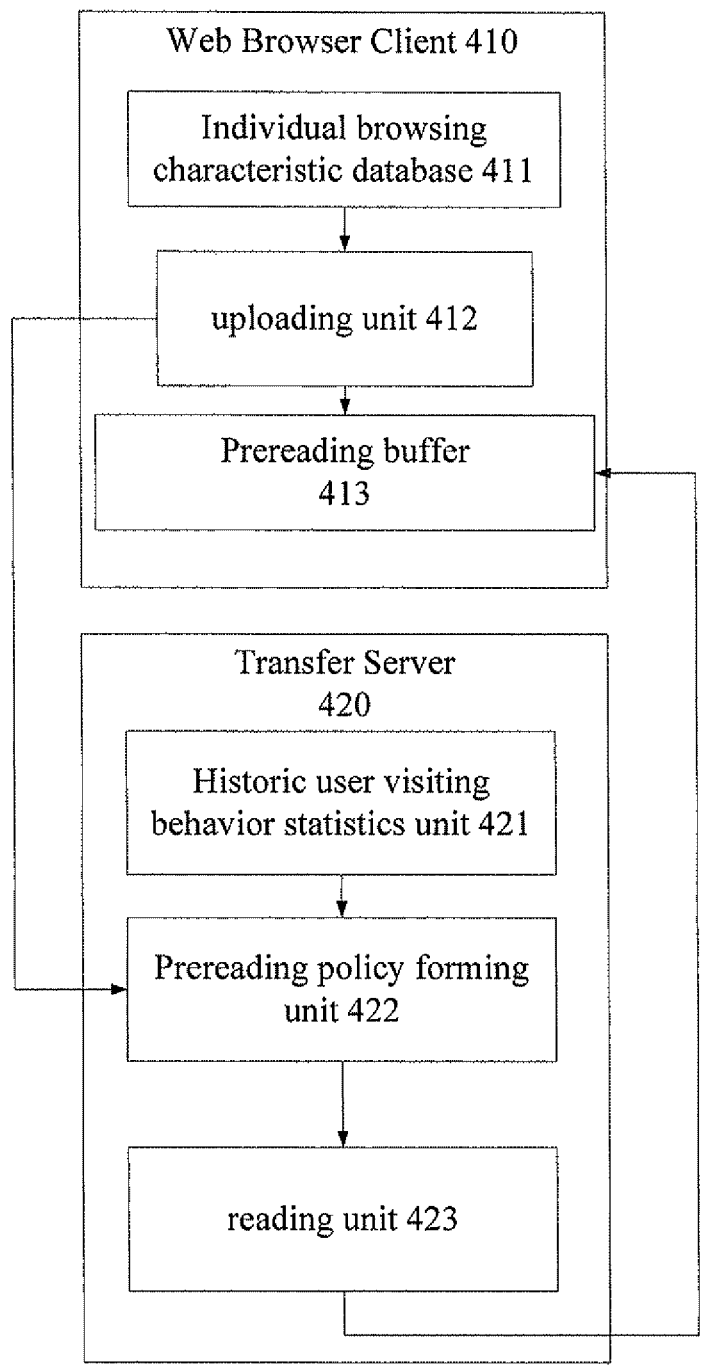
FIG. 4 is a system structure diagram of an embodiment of the present invention.

FIG. 4 shows the structure diagram of one embodiment of the present invention.

The Web browser prereading system 400 includes a mobile terminal Web browser client 410 connected with a transfer server 420, wherein the mobile terminal Web browser client 410 is provided with an individual browsing record characteristic database 411 for storing user's individual browsing record characteristics, and an uploading module 412 for submitting the first Web page visiting request to the target server via the transfer server and uploading the individual browsing record characteristics of the first Web page to the transfer server.

The transfer server 420 is provided with a history user visiting behavior statistic unit 421 for storing one or more swarm browsing record characteristics of multiple users. As shown in FIG. 1, in this embodiment, the history user visiting behavior statistic unit 421 is implemented with the mass user history visiting behavior statistics server 4.

The transfer server 420 is also provided with a prereading policy forming unit 422 for forming a prereading policy according to the received individual browsing record characteristics of the first Web page and the previously stored at least one swarm browsing record characteristic of the first Web page, and a preread file reading unit 423 for acquiring Web pages according to the prereading policy and sending them to the buffer of the browser client.

The browser client 410 further includes a prereading buffer 413 for storing the preread contents returned by the preread file reading unit 423 into the buffer.

What is claimed is:

1. A prereading method for a Web browser, comprising:
submitting a first Web page visiting request from a Web browser client to a target server, and uploading an individual browsing record characteristic of the first Web page from the Web browser client to a transfer server;
forming, by the transfer server, a prereading policy according to the received individual browsing record characteristic of the first Web page and stored at least one swarm browsing record characteristic of the first Web page; and
acquiring, by the transfer server, a Web page from the target server according to the prereading policy and sending the acquired Web page to the Web browser client for buffering,
wherein the step of forming, by the transfer server, the prereading policy according to the received individual browsing record characteristic of the first Web page and the at least one swarm browsing record characteristic of the first Web page comprises:
sorting one or more page elements on the first Web page according to their prereading preference scores, and
acquiring, by the transfer server, linked contents according to link addresses included in first K page elements of the sorted one and more page elements, as preread contents, wherein K is a natural number greater than or equal to 1.

2. The prereading method according to claim 1, wherein the individual browsing record characteristic is an individual visiting frequency of one or more page elements containing link addresses on the first Web page, and the swarm browsing record characteristic is a swarm visiting frequency of the transfer server for one or more page elements on the first Web page.

3. The prereading method according to claim 2, wherein:
an individual browsing record characteristics weight corresponding to the individual browsing record characteristic and a swarm browsing record characteristic weight corresponding to the one or more swarm browsing record characteristics are set in advance; and
a summation of the individual browsing record characteristic weight and the one or more swarm browsing record characteristic weights is 1.

4. The prereading method according to claim 2, wherein the prereading policy further comprises:
setting each page element with an individual preference coefficient according to the individual browsing record characteristic,
setting an order of the individual preference coefficients according to an order of the individual visiting frequencies of the page elements of the first Web page,
setting each page element with a swarm preference coefficient according to the swarm browsing record characteristic,
setting an order of the swarm preference coefficients according to an order of the swarm visiting frequencies of the page elements of the first Web page, and
calculating the prereading preference score of each page element according to the individual preference coefficient and the swarm preference coefficient.

5. The prereading method according to claim 2, wherein the prereading policy further comprises:
- sorting one or more page elements on the first Web page according to their prereading preference scores, and
- merging and reorganizing, by the transfer server, the linked contents acquired according to link addresses included in the first K page elements of the sorted one or more page elements, as preread contents.

6. The prereading method according to claim 1, wherein:
- each page element is set with an individual preference coefficient according to the individual browsing record characteristic,
- the individual preference coefficient is the individual visiting frequency of the page element,
- each page element is set with a swarm preference coefficient according to the swarm browsing record characteristic,
- the swarm preference coefficient is the swarm visiting frequency of the page element, and
- the prereading preference score of each page element is calculated according to the individual preference coefficient and the swarm preference coefficient.

7. The prereading method according to claim 1, wherein the at least one swarm browsing record characteristic includes a first swarm browsing record characteristic, and the first swarm browsing record characteristic with respect to a swarm visiting frequency for one or more page elements on the first Web page is determined as follows:
- performing statistical analysis, by the transfer server, on the first Web page; and
- if a page element containing a link address includes a key point, querying a history frequency of visiting the key point as the swarm visiting frequency for the page element containing the key point, the key point being determined via historical statistics.

8. The prereading method according to claim 7, wherein the swarm visiting frequency for one or more page elements on the first Web page is determined as follows:
- performing statistical analysis, by the transfer server, on the first Web page, and
- if a page element containing a link address includes a key point, querying a frequency of visiting the key point in historically visiting the first Web page, as the swarm visiting frequency for the page element containing the key point.

9. The prereading method according to claim 8, wherein the key point is a keyword or a key diagram.

10. The prereading method according to claim 1, wherein the Web browser client further uploads one or more individual identity characteristics associated with the user's identity, the transfer server further saves the one or more swarm identity characteristics associated with the user swarm identity,
- the at least one swarm browsing record characteristic includes a second swarm browsing record characteristic, the second swarm browsing record characteristic with respect to a swarm visiting frequency for one or more page elements on the first page is determined as follows:
- performing statistical analysis, by the transfer server, on the first Web page,
- if a page element containing a link address includes a key point, querying a history frequency of visiting the key point with respect to a swarm identity characteristic corresponding to the individual identity characteristic, as the swarm visiting frequency for the page element containing the key point, the key point being determined via historical statistics.

11. The prereading method according to claim 10, wherein the swarm visiting frequency for one or more page elements on the first Web page is determined as follows:
- performing statistical analysis, by the transfer server, on the first Web page; and
- if a page element containing a link address includes a key point, querying a frequency of visiting the key point in historically visiting the first Web page, as the swarm visiting frequency for the page element containing the key point.

12. The prereading method according to claim 1, wherein the at least one swarm browsing record characteristic includes a third swarm browsing record characteristic, the third swarm browsing record characteristic with respect to a swarm visiting frequency for one or more page elements on the first Web page is determined as follows:
- performing statistical analysis, by the transfer server, on the first Web page and querying a history frequency of turning to a second Web page after visiting the first Web page;
- determining a page element associated with the second Web page according to a link address contained in the page element on the first Web page to obtain the swarm visiting frequency for the page element.

13. The prereading method according to claim 1, wherein the browser client further uploads one or more individual identity characteristics associated with the user's identity, the transfer server further saves the one or more swarm identity characteristics associated with the user swarm identity,
- the at least one swarm browsing record characteristic includes a fourth swarm browsing record characteristic, the fourth swarm browsing record characteristic with respect to a swarm visiting frequency for one or more page elements on the first Web page is determined as follows:
- performing statistical analysis, by the transfer server, on the first Web page, and querying a history frequency of turning to a third Web page after visiting the first Web page with respect to the swarm identity characteristic corresponding to the individual identity characteristic;
- determining a page element associated with the third Web page according to a link address contained in the page element on the first Web page, to obtain the swarm visiting frequency for the page element.

14. The prereading method according to claim 1, wherein the Web browser client is a mobile communication equipment terminal.

15. A prereading system for a Web browser, comprising:
- an individual browsing record characteristic uploading hardware unit provided at a Web browser client, configured for submitting a first Web page visiting request to a target server and uploading an individual browsing record characteristic of the first Web page to a transfer server;
- a prereading policy forming unit provided at the transfer server, configured for forming a prereading policy according to the received individual browsing record characteristic of the first Web page and the stored at least one swarm browsing record characteristic of the first Web page; and
- a preread file reading unit provided at the transfer server, configured for acquiring a Web page from the target server according to the prereading policy, and for sending the Web page to the Web browser client for buffering,
- wherein forming the prereading policy, by the prereading policy forming unit, according to the received individual browsing record characteristic of the first Web page and the stored at least one swarm browsing record characteristic for the first Web page comprises:
sorting one or more page elements on the first Web page according to their prereading preference scores, and
acquiring, by the transfer server, linked contents according to link addresses contained in first K page elements of the sorted one or more page elements, as the preread contents, wherein K is a natural number greater than or equal to 1.

16. The prereading system according to claim 15, wherein the individual browsing record characteristic is an individual visiting frequency of one or more page elements containing link addresses on the first Web page, and the swarm browsing record characteristic is a swarm visiting frequency of the transfer server with respect to one or more page elements on the first Web page.

17. The prereading system according to claim 16, wherein:
an individual browsing record characteristics weight corresponding to the individual browsing record characteristic and a swarm browsing record characteristic weight corresponding to the one or more swarm browsing record characteristics are set in advance; and
a summation of the individual browsing record characteristic weight and the one or more swarm browsing record characteristic weights is 1.

18. The prereading system according to claim 16, wherein the prereading policy further comprises:
setting each page element with an individual preference coefficient according to the individual browsing record characteristic,
setting an order of the individual preference coefficients according to an order of the individual visiting frequencies of the page elements of the first Web page,
setting each page element with a swarm preference coefficient according to the swarm browsing record characteristic,
setting an order of the swarm preference coefficients according to an order of the swarm visiting frequencies of the page elements of the first Web page, and
calculating the prereading preference score of each page element according to the individual preference coefficient and the swarm preference coefficient.

19. The prereading system according to claim 16, wherein the prereading policy further comprises:
sorting one or more page elements on the first Web page according to their prereading preference scores, and
merging and reorganizing, by the transfer server, the linked contents acquired according to link addresses included in first K page elements of the sorted one or more page elements, as preread contents.

20. The prereading system according to claim 15, wherein:
each page element is set with an individual preference coefficient according to the individual browsing record characteristic,
the individual preference coefficient is the individual visiting frequency of the page element,
each page element is set with a swarm preference coefficient according to the swarm browsing record characteristic,
the swarm preference coefficient is the swarm visiting frequency of the page element, and
the prereading preference score of each page element is calculated according to the individual preference coefficient and the swarm preference coefficient.

21. The prereading system according to claim 15, wherein the prereading policy forming unit further includes a first swarm browsing record characteristic recording module configured to record a first swarm browsing record characteristic, the first swarm browsing record characteristic with respect to a swarm visiting frequency for one or more page elements on the first Web page is determined as follows:
performing statistical analysis, by the first swarm browsing record characteristic recording module, on the first Web page; and
if a page element containing a link address includes a key point, querying a history frequency of visiting the key point as the swarm visiting frequency for the page element containing the key point, the key point being determined via historical statistics.

22. The prereading system according to claim 15, an individual identity characteristic uploading unit provided at the Web browser client, configured to upload one or more individual identity characteristics associated with a user's identity; the transfer server, configured to store one or more swarm identity characteristics associated with a user's swarm identity,
the prereading policy forming unit further comprises a second swarm browsing record characteristic recording module configured to record a second swarm browsing record characteristic, the second swarm browsing record characteristic with respect to a swarm visiting frequency for one or more page elements on the first Web page is determined as follows:
performing statistical analysis, by the second swarm browsing record characteristic recording module, on the first Web page,
if a page element containing a link address includes a key point, querying a history frequency of visiting the key point with respect to a swarm identity characteristic corresponding to the individual identity characteristic, as the swarm visiting frequency for the page element containing the key point, the key point being determined via historical statistics.

23. The prereading system according to claim 22, wherein the swarm visiting frequency for one or more page elements on the first Web page by the second swarm browsing record characteristic recording module is determined as follows:
performing statistical analysis, by the second swarm browsing record characteristic recording module, on the first Web page, and
if a page element containing a link address includes a key point, querying a frequency of visiting the key point in historically visiting the first Web page, as the swarm visiting frequency for the page element containing the key point.

24. The prereading system according to claim 23, wherein the key point is a keyword or a key diagram.

25. The prereading system according to claim 15, wherein the prereading policy forming unit further comprises a third swarm browsing record characteristic recording module configured to record a third swarm browsing record characteristic, the third swarm browsing record characteristic with respect to a swarm visiting frequency for one or more page elements on the first Web page is determined as follows:
performing statistical analysis, by the third swarm browsing record characteristic recording module, on the first Web page and querying a history frequency of turning to a second Web page after visiting the first Web page;
determining a page element associated with the second Web page according to a link address contained in the page element on the first Web page to obtain the swarm visiting frequency for the page element.

26. The prereading system according to claim 15, further comprising:

an individual identity characteristic uploading unit provided at the Web browser client, configured to upload one or more individual identity characteristics associated with a user's identity;

a swarm identity characteristic storing unit provided at the transfer server, configured to store one or more swarm identity characteristics associated with a user's swarm identity, the prereading policy forming unit further comprises a fourth swarm browsing record characteristic recording module, the fourth swarm browsing record characteristic with respect to a swarm visiting frequency for one or more page elements on the first Web page is determined as follows:

performing statistical analysis, by the fourth swarm browsing record characteristic recording module, on the first Web page, and querying a history frequency of turning to a third Web page after visiting the first Web page with respect to the swarm identity characteristic corresponding to the individual identity characteristic;

determining a page element associated with the third Web page according to a link address contained in the page element on the first Web page, to obtain the swarm visiting frequency for the page element.

27. The prereading system according to claim 15, wherein the Web browser client is a mobile communication equipment terminal.

* * * * *